Patented Nov. 11, 1952

2,617,838

UNITED STATES PATENT OFFICE 2,617,838

ISOMERIZATION OF AROMATIC COMPOUNDS

Joseph E. Nickels, Pittsburgh, Pa., assignor to Koppers Company, Inc., Pittsburgh, Pa., a corporation of Delaware No Drawing. Application October 2, 1947, Serial No. 777,581

13 Claims. (Cl. 260—668)

1

This invention relates to isomerization of aromatic compounds and is particularly directed to improvements in processes in which one position isomer is transformed into another position isomer by vapor phase catalysis.

It is known in the art that certain aromatic compounds capable of existing in the form of one or more position isomers may be transformed from one position isomer to another by subjecting one or more of such position isomers to the action of a suitable catalyst under isomerization conditions. It has been reported for example that 1-methyl, 1-ethyl and 1-phenyl naphthalenes may be isomerized to the 2-position isomers by silica gel. It is also known that ortho dialkyl benzenes may be converted to the meta and para isomers by means of alumina-silica catalysts. My own research has shown additionally that vapor phase isomerizations of such compounds as ethyl naphthalene may be effected over various aluminum catalysts as well as other catalysts such as iron meta phosphate. It is thus possible to conduct a wide variety of vapor phase isomerizations involving position isomers of aromatic compounds.

I am aware also that like isomerizations have been effected in the prior art using a Friedel-Crafts catalyst and that in such processes it is common to use hydrogen chloride as a promoter. The action of hydrogen chloride in such cases is due apparently to the greater solubility which it imparts to the Friedel-Crafts catalysts, e. g., aluminum chloride in the hydrocarbon. The processes to which the present invention relates, however, are of an entirely different type from the Friedel-Crafts processes in that they involve vapor phase catalysis in which vapors of the proisomate, i. e., the material subjected to isomerizations, are contacted with a solid catalytic material more generally of the surface active type.

In carrying out the processes of the latter type, that is to say, processes to which this invention relates, the catalyst tends to become inactivated by the deposition of carbon or due to other causes. Similarly, the activity of a regenerated catalyst may be low and for that matter even the activity of a newly formed catalyst may be too low. There is the need in the art, therefore, for a simple way of activating such catalysts.

I have now found that in vapor phase isomer-

2 ization processes of the character above described the catalyst may be activated by incorporating a hydrogen halide into the vapors of the proisomate.

In carrying out the processes of the invention I introduce into the proisomate gas or vapor a suitable amount of hydrogen halide either as such or in the form of a compound which, under the conditions of the isomerization, breaks down to give hydrogen halide. In other words, the hydrogen halide may be added as such or formed in situ from a suitable hydrogen halide precursor added to the gas stream. The mixture is then passed over the solid catalyst at a temperature and pressure characteristic of the isomerization as determined by the nature of the proisomate and the catalyst.

The invention may be more fully understood by reference to the following examples in which the parts are by weight and in the c. g. s. system unless otherwise specified.

EXAMPLE I

A mixture consisting essentially of ethylnaphthalenes and analyzing 3.5% polyethylnaphthalenes and 96.5% ethylnaphthalenes of which 50.7% was 1-ethylnaphthalene and 49.2% was 2-ethylnaphthalene, was vaporized and preheated to 425° C. and passed through a catalyst bed heated to 425° C. The catalyst was a regenerated 50% MgO—Al₂O₃ catalyst prepared by co-precipitation of magnesium and aluminum chloride by addition of ammonia. The regeneration was effected by heating the spent catalyst at about 550° C. in a stream of air for about 4 hours, until all deposited carbon was burned off. The proisomate ethylnaphthalene mixture was passed through the catalyst bed at a rate of 0.5 volume of liquid per volume of catalyst per hour; that is to say, at a liquid hourly space velocity (L. H. S. V.) of 0.5, and the run was continued for 42 hours. After 18 hours on stream, hydrogen chloride was introduced into the preheater at the rate of about 2.5 parts of hydrogen chloride for every 100 parts of proisomate. This was continued for 12 hours with dry hydrogen chloride and then for an additional 12 hours with hydrogen chloride saturated with water by first bubbling it through concentrated hydrochloric acid. The average product distribution of the proisomate was: gases 0.0%, liquid 99.8%, and carbon 0.2%. The distribution of isomers in the isomate is given in the following table: The average liquid composition was naphthalene 0.7%, ethylnaphthalene 97.4%, polyethylnaphthalenes 1.9%.

Table

| Time on Stream, hrs. | 0–12 | 12–18 | 18–24 | 24–30 | 30–36 | 36–42 |
|---|---|---|---|---|---|---|
| Hydrogen Chloride | none | none | dry | dry | moist | moist |
| 2-EN in EN Fract., wt. percent | 66.2 | 61.0 | 77.1 | 78.0 | 73.0 | 73.7 |
| Average, wt. percent | 64.5 | | 75.5 | | | |
| 1-EN Isomerized, wt. percent | 33.4 | 23.1 | 54.9 | 56.7 | 46.8 | 48.2 |
| Average, wt. percent | 30.0 | | 51.7 | | | |

NOTE.—EN = ethylnaphthalene.

It will be observed that hydrogen chloride caused a substantial increase in the activity of the catalyst even after the activity of the catalyst had begun to drop off substantially. Moreover, the average conversion effected during the introduction of hydrochloric acid was substantially greater than that during the time when hydrogen chloride was not added. It may be observed still further that the greatest conversion is obtained with dry hydrogen chloride. It is significant to note that after 42 hours the catalyst was more active than at the beginning due to the actification of the hydrogen chloride.

EXAMPLE II

The procedure of Example I was duplicated using freshly prepared 50% MgO—Al$_2$O$_3$ catalyst. The run was continued for 24 hours, the first 12 of which was made without an activator, and the last 12 with chloroform as the activator. Thus, during the last 12 hours of the run 7.8 parts of chloroform for every 100 parts of proisomate was introduced into the vaporizer. The temperature was 425° C. and the liquid hourly space velocity was 0.50. During the first 12 hours 20% of the 1-ethylnaphthalene isomerized to 2-ethylnaphthalene whereas during the second 12 hour period 30% isomerized, thus indicating substantial activation of the catalyst by the chloroform.

EXAMPLE III

The procedure of Example I was followed using silica gel as the catalyst. Two separate runs were made, one with dry hydrogen chloride and one without. With hydrogen chloride the liquid hourly space velocity of ethylnaphthalene was 0.50, without hydrogen chloride it was 0.45. With hydrogen chloride the length of the run was 15 hours; without, it was 10 hours. In both cases the temperature was 425° C. Without hydrogen chloride 9.3% 1-ethylnaphthalene isomerized, whereas with hydrogen chloride 31.1% isomerized. Hydrogen chloride was introduced at the same rate as in Example I.

EXAMPLE IV

The procedure of Example I was followed using iron meta phosphate as the catalyst. Two runs were made; one with hydrogen chloride and one without. With hydrogen chloride the liquid hourly space velocity of ethylnaphthalene was 0.50; without, it was 0.46. With hydrogen chloride the length of the run was 15; without, it was 10. Hydrogen chloride was introduced at the same rate as in Example I and the temperature was 425° C. Without hydrogen chloride 3.3% 1-ethylnaphthalene isomerized, whereas with hydrogen chloride 19.7% isomerized.

While I have illustrated my invention with reference to particular embodiments thereof, it is to be understood that variation may be made therein without departing from the spirit and scope of the invention. Thus, variation may be made in time, temperature, pressure, proportions, catalysts, proisomate, etc. without departing from the spirit and scope of the invention.

While, in the examples, atmospheric pressure has been used, it is to be understood that the pressure may be either superatmospheric or less than atmospheric. In other words, the pressure is not critical and any pressure up to the critical pressure may be used. The temperature, likewise, is illustrative and substantial variation from the 425° C. given in the examples may be made without departing from the spirit and scope of the invention. Since this invention is in the nature of an improvement in isomerization processes, in which the temperature conditions are not substantially effected, the temperatures used may be those which are useful in the original process. In general, however, a somewhat lower temperature may be used due to the increased activity of the catalyst. The temperature may vary somewhat according to the nature of the catalyst and the proisomate, but ordinarily satisfactory results will be obtained within the range of from 300° C. to 650° C. especially for ethylnaphthalenes.

The liquid hourly space velocity may be varied, also according to the nature of the proisomate, temperature of operation and the catalyst or in accordance with the preference of the operator. Generally speaking, however, little advantage is obtained by long contact times so that space velocities ranging from 0.2 to 10 volumes of proisomate per volume of catalyst per hour will ordinarily produce satisfactory results.

Variation may also be made in the amount of the hydrogen halide; likewise, any of the hydrogen halides may be used in place of hydrogen chloride. The amount required is very small in proportion to the amount of proisomate processed, but the amount may range to a substantial portion of the mixture passed through the catalyst bed. Quantities greater than about 15 parts for each 100 parts of proisomate, however, appear to be unnecessary and to act only as diluent or carrier gas in the process.

Generally speaking, any one of two or more position isomers may be converted to another. For example, 1-ethylnaphthalene may be converted to 2-ethylnaphthalene and vice versa. With a sufficiently activated catalyst it is possible to approach the equilibrium composition from either side. With ethylnaphthalene the equilibrium concentration appears to be in the vicinity of 80% of the 2-isomer and 20% of the 1-isomer. With a sufficiently active catalyst this equilibrium mixture can be attained or approached from either side. Hydrogen halide may be used effectively, even with such highly active catalysts and afford advantages in lowered temperatures and/or increased space velocities.

While the invention has been illustrated in the examples with reference to ethylnaphthalenes, it is to be understood that in its broader aspects the invention is applicable to effecting isomeric rearrangements in other aromatic compounds capable of existing in two or more position isomers, such, for example, as the dialkyl benzenes such as the xylenes, the diethyl benzenes and like benzene derivatives, the alkylated naphthalenes such as methyl and ethyl naphthalene and the higher homologues thereof, alkylated phenols such as cresols, xylenols, ethyl phenols and higher homologues thereof, dinaphthyls, halogenated benzenes and naphthalenes and like substituted aromatic compounds.

Having thus fully described my invention, what I now claim as new and desire to secure by Letters Patent is:

1. In a process for the catalytic isomerization of a proisomate consisting essentially of a substituted aromatic compound capable of existing in the form of two or more position isomers, the steps of vaporizing the proisomate, combining the proisomate vapors with a hydrogen halide and passing the mixture thus obtained over an isomerization catalyst under isomerizing conditions, in which said catalyst is a magnesia-alumina catalyst.

2. The process of claim 1 in which the isomerization is affected in the absence of moisture.

3. The method of claim 1 in which the hydrogen halide is hydrogen chloride.

4. The process of claim 3 in which the hydrogen chloride is added as such.

5. The process of claim 3 in which the hydrogen halide is generated in situ.

6. The process of claim 1 in which the proisomate is ethylnaphthalene.

7. The process of claim 6 in which the proisomate contains 1-ethylnaphthalene in excess of the equilibrium mixture.

8. The method of claim 6 in which the 1- and 2-isomers are present in substantially equal proportions.

9. The process of claim 2 in which the hydrogen halide is hydrogen chloride.

10. The process of claim 9 in which the proisomate is ethyl naphthalene.

11. The process of claim 1 in which the substituted aromatic compound is one of the ethylnaphthalene isomers and in which the catalysis is effected by passing the proisomate vapors in admixture with the hydrogen halide in contact with the catalyst at a temperature between 300° C. and 650° C. at a liquid hourly space velocity ranging from 0.2 to 10, and in which the amount of hydrogen halide is not in excess of 15 parts for each 100 parts of proisomate.

12. The process of isomerizing alpha-ethylnaphthalene to beta-ethylnaphthalene in a mixture containing substantially equal parts of the two isomers which comprises vaporizing said mixture, passing the vapors in admixture with hydrogen halide in contact with magnesia-alumina catalyst under isomerizing conditions.

13. The process of claim 12 in which the contact is effected at a temperature between 300° C. and 650° C. at a lquid hourly space velocity ranging from 0.2 to 10, and in which the amount of hydrogen halide is not in excess of 15 parts for each 100 parts of proisomate.

JOSEPH E. NICKELS.

REFERENCES CITED

The following references are of record in the file of this patent:

UNITED STATES PATENTS

| Number | Name | Date |
|---|---|---|
| 2,246,900 | Schulze et al. | June 24, 1941 |
| 2,313,053 | De Simo | Mar. 9, 1943 |
| 2,337,123 | Olin et al. | Dec. 21, 1943 |
| 2,357,978 | Schmerling et al. | Sept. 12, 1944 |
| 2,403,757 | Reeves | July 9, 1946 |
| 2,411,799 | Mattox | Nov. 26, 1946 |
| 2,417,699 | McAllister et al. | Mar. 18, 1947 |
| 2,420,086 | McAllister et al. | May 6, 1947 |
| 2,422,171 | Saunders | June 10, 1947 |
| 2,422,798 | Pines | June 24, 1947 |
| 2,425,559 | Passino et al. | Aug. 12, 1947 |

OTHER REFERENCES

Egloff et al.: Isomerization of Pure Hydrocarbons, pub. Reinhold Pub. Corp., New York (1942), pp. 386, 387 (2 pages).